United States Patent
Steiner et al.

(10) Patent No.: US 6,995,343 B2
(45) Date of Patent: Feb. 7, 2006

(54) METHOD AND DEVICE FOR LIMITING AND/OR CONTROLLING THE SURFACE TEMPERATURE OF A HOB

(75) Inventors: Herbert Steiner, Traunstein (DE); Tonoha Ramones, Traunstein (DE); Günter Zschau, Traunreut (DE); Peter Blumenthal, Traunstein (DE); Johann Huber, Inzell (DE); Andreas Marbach, Traunwalchen (DE); Monika Zeraschi, Traunreut (DE); Bernd Stitzl, Lauter (DE); Franz Fuchs, Hunderdorf (DE); Dan Neumayer, Bernau (DE); Jose-Andres Garcia, Traunreut (DE); Ernst Schweidler, Stein/Traun (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 19 days.

(21) Appl. No.: 10/703,238

(22) Filed: Nov. 7, 2003

(65) Prior Publication Data

US 2004/0159650 A1 Aug. 19, 2004

(30) Foreign Application Priority Data

May 9, 2001 (DE) ......................................... 101 22 427

(51) Int. Cl.
*H05B 3/68* (2006.01)

(52) U.S. Cl. ................................ 219/448.11; 219/465.1; 219/448.13; 219/458.1; 219/448.1; 219/505; 219/452.12; 219/460.1

(58) Field of Classification Search .............. 219/465.1, 219/467.1, 505, 466.1, 448.1, 543, 452.12, 219/460.1, 478.11, 458.1, 448.13, 494, 448.11
See application file for complete search history.

(56) References Cited

U.S. PATENT DOCUMENTS 5,961,867 A 10/1999 McWilliams
6,218,646 B1 * 4/2001 Nass et al. ................... 219/497

FOREIGN PATENT DOCUMENTS

| DE | 19617319 A1 | 10/1997 |
| DE | 19648196 A1 | 11/1997 |
| DE | 19851029 A1 | 5/2000 |
| DE | 19851029 A | 5/2000 |
| EP | 0658067 A1 | 6/1995 |
| EP | 0886459 A2 | 12/1998 |

* cited by examiner

*Primary Examiner*—Shawntina T. Fuqua
(74) *Attorney, Agent, or Firm*—John T. Winburn; Russell W. Warnock; Craig J. Loest

(57) ABSTRACT

A method and device for limiting and/or controlling the surface temperature of a hob having a ceramic cooking surface. The hob is heated by an energy source which includes a temperature limiter with a variable switching temperature. The switching temperature of the temperature limiter is varied during a cooking procedure according to a redetermined switching temperature-time profile.

3 Claims, 3 Drawing Sheets

METHOD AND DEVICE FOR LIMITING AND/OR CONTROLLING THE SURFACE TEMPERATURE OF A HOB

BACKGROUND OF THE INVENTION

Field of the Invention

The present invention relates to a method for limiting and/or controlling the surface temperature of a hob or cooktop that is heated by an energy source and provided with a temperature limiter, in particular a hob with a ceramic cooking surface. The present invention also relates to a device for carrying out this method.

The hobs of modem ceramic cooking surfaces are manufactured in such a way as to yield a low thermal expansion of the ceramic material for practical use. If impermissibly high temperature/time loads arise during use, these extreme loads can alter the structure of the material, and, in the worst case scenario, result in the destruction of the ceramic cooking surface.

Known from practice for monitoring the surface temperature of such hobs is to provide operating temperature limiters, which are adjusted in such a way as not to exceed the permissible temperature/time load of the ceramic cooking surface over a predetermined minimum service life of the hob and given an assumed frequency of use. The use of mechanical operating temperature limiters, e.g., dust expansion controllers, or also electronic operating temperature limiters, is known for this purpose. However, the disadvantage to known dust expansion controllers is that their switching point can only be set to approx. ±20 K, so that the maximum permissible temperature cannot be precisely adjusted. The switching point to be adjusted also depends on the still permissible heating of the wall surfaces located behind and/or next to the hob when a hob is unintentionally operated without a cooking vessel. In order to satisfy the safety requirements here, the limiting temperature must often be adjusted far below the value that would actually be possible relative to the loading capacity of the ceramic material. This can lead to disadvantages in performance capability, in particular as relates to the parboiling times.

DE 198 51 029 A1 discloses a method for electronically limiting the surface temperature of a glass/ceramic cooking surface. In this known method, the temperature/time load is measured continuously in intervals using temperature/time value pairs, and the operating temperature of the glass/ceramic is varied as a function of a comparison to a predetermined setpoint load. This known electronic limitation of the surface temperature hence makes it possible to adjust an ensuing cooking procedure to the measured actual previous load on the hob.

The disadvantage to the methods known from practice is that the operating temperature limiters cannot determine whether a maximum permissible surface temperature persisting over a predetermined timeframe involves a malfunction, e.g., the heating of an empty cooking vessel, or an extreme cooking procedure that requires a high operating temperature over a long operating period, as can be the case of prolonged fritting, for example.

BRIEF SUMMARY OF THE INVENTION

Proceeding from the above, the object of the invention is to provide a method for limiting and/or controlling the surface temperature of a hob that is heated by an energy source, versatile, and makes it possible to determine whether a cooking procedure is conventional, extreme or impermissible. Another object of the invention is to provide a device for implementing the method.

The invention prescribes a switching temperature-time curve for a cooking procedure to which the switching temperature of a temperature limiter is adjusted during the cooking procedure. The switching temperature of the temperature limiter can here be controlled in such a way as to continuously measure the actual temperature of the hob and compare it with stored switching temperature-time profiles to vary the switching temperature of the temperature limiter accordingly based on the result of this comparison during the cooking procedure. Alternatively, the switching temperature of the temperature limiter can also be adjusted according to strictly prescribed time increments. Adjusting the switching temperature during the cooking procedure makes it possible to always set the surface temperature in such a way that the most effective possible cooking procedure can take place, and the permissible surface temperature along with the furniture pitching temperature relative to other furniture is not exceeded.

In a preferred embodiment, the switching temperature of the temperature limiter is reduced if the comparison shows that the stored switching temperature-time profile has been reached or exceeded. The advantage to decreasing the switching temperature as opposed to deactivating the power supply once the switching temperature has been reached or exceeded as known in the art is that the cooking procedure is not interrupted, so that the hob user will hardly notice any change in the cooking procedure.

In order to ensure that power supply to the hob is interrupted given an impermissible cooking procedure, e.g., heating an empty hob, the stored switching temperature-time profile corresponds to this impermissible heating empty procedure.

In another preferred embodiment, the switching temperature of the electronic temperature limiter is set to a maximum value to enable a rapid parboiling procedure. Depending on the selected cooking stage, the switching temperature is lowered after several clock cycles of the temperature limiter and/or after a prescribed time interval. In this case, monitoring takes place to determine whether and how often the switching temperature is reached in a clock cycle or time interval.

BRIEF DESCRIPTION OF THE DRAWING

Additional features and advantages of the present invention can be gleaned from the following description of the accompanying drawing, which provided only an exemplary, diagrammatic view of the structure of a device according to the present invention, and of a flowchart for the method according to the present invention.

DETAILED DESCRIPTION OF THE INVENTION

Figure 1:
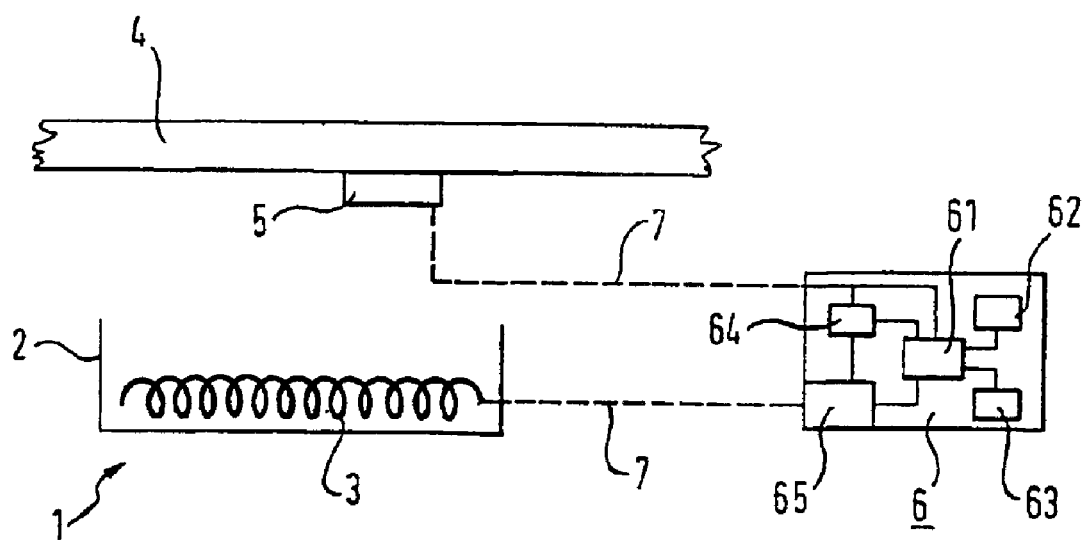
FIG. 1 shows a diagrammatic side view of a device according to the present invention for limiting and/or controlling the surface temperature of a hob.

The drawing on FIG. 1 shows a cooking tray 1 with an energy source 3, e.g., a heater coil, arranged in an insulating body 2. The cooking tray 1 has a cooking surface 4 made out of ceramic material, on which pots, pans, etc. (not illustrated) can be placed and heated.

The device shown also has a temperature sensor 5 located under the cooking surface 4, and also a controller 6 with a processor 61. The temperature sensor 5 can be arranged between the heater coil and ceramic cooking surface 4, or directly on the ceramic of the cooking surface 4. Lines 7 connect the processor of the controller 6 with both the temperature sensor 5 and a control input for the energy source 3. The controller 6 also incorporated a time measuring device 62, an electronic memory 63, which stores at least one preset switching temperature-time profile, a temperature limiter 64 with variable switching temperature, and a contact element 65 for controlling the energy source 3.

Figure 2:
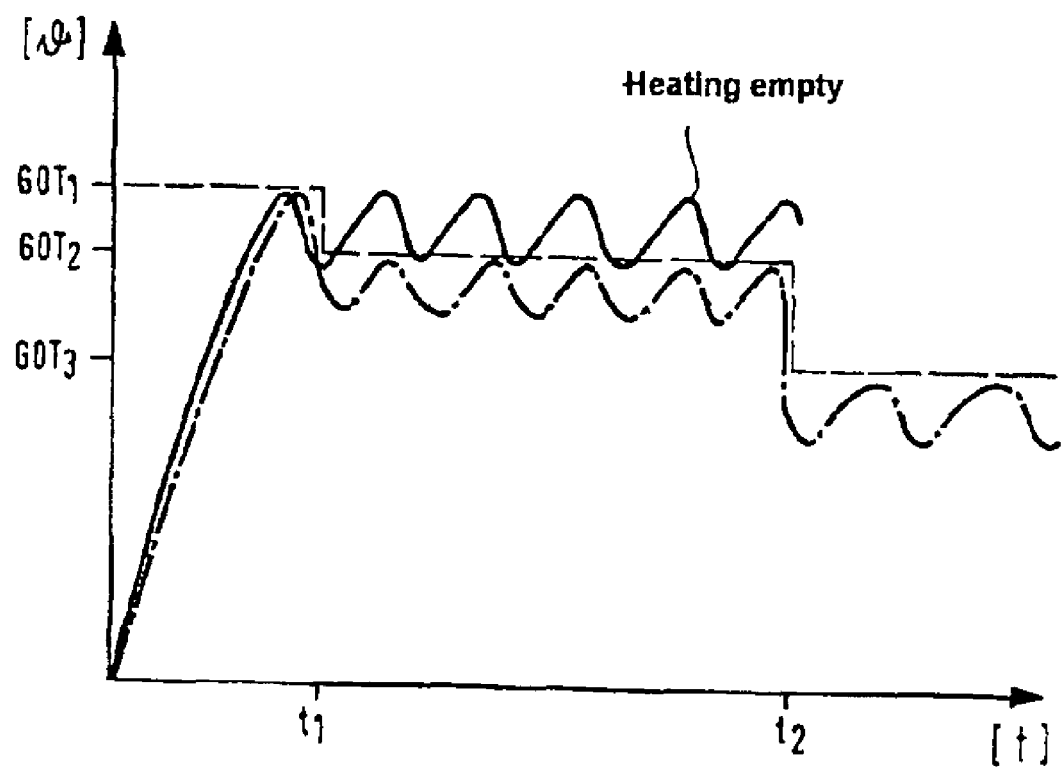
FIG. 2 shows a diagrammatic temperature-time chart.

FIG. 2 shows an example of the temperature-time curve for the "heating empty" procedure, as well as the temperature-time curve for a cooking procedure in which the surface temperature of the hob was controlled according to this method.

As evident from FIG. 2, the impermissible heating empty procedure designed by the solid line is characterized by the fact that the cooking surface 4 is heated to the set maximum switching temperature of the temperature limiter 64. As soon as this glass surface temperature (GOT) has been reached, the temperature limiter 64 cuts off the power supply 3 via the contact element 65 until the cooking surface 4 has again cooled to a predetermined value. Since no heat is dissipated to a cooking entree or kitchen utensils while heating empty, the cooking surface 4 is subsequently heated again until it reaches the maximum switching temperature. This alternating process is repeated continuously in this impermissible cooking procedure. In addition to the resultant unnecessary exposure of the ceramic cooking surface 4 to heat the danger in this procedure is that the furniture pitching temperature of the range is exceeded, so that the furniture adjacent to the range can become damaged.

As opposed to the impermissible cooking procedure described above, the initially set maximum glass surface temperature $GOT_1$ is reduced after this temperature has been reached in the parboiling phase to the value $GOT_2$ in the permissible cooking procedure denoted by the hatched line, so that the ceramic cooking surface 4 is not subjected to an excessive thermal load. The permissible cooking procedure is stored in the electronic memory 63 of the controller 6 as switching temperature-time profile.

The reduction in switching temperature from $GOT_1$ to $GOT_2$ can here be controlled in such a way as to continuously measure the actual temperature with the temperature sensor 5, and compare it in the processor 61 of the controller 6 with the prescribed switching temperature-time profile in the electronic memory 63, so that the switching temperature of the temperature limiter 64 can be set according to the prescribed switching temperature-time profile. However, it is also possible for the processor 61 to automatically reduce the switching temperature of the temperature limiter 64 from $GOT_1$ to $GOT_2$ after a prescribed time span t1 acquired with the time measuring device 62 has elapsed, wherein the time span ti corresponds to the usual parboiling phase. In a like manner, the switching temperature can automatically be lowered from $GOT_2$ to $GOT_3$ after another time span $t_2$ has elapsed, e.g., to prevent the permissible furniture pitching temperature from being exceeded. As an alternative, this additional temperature reduction can be controlled via a temperature measuring procedure.

Figure 3:
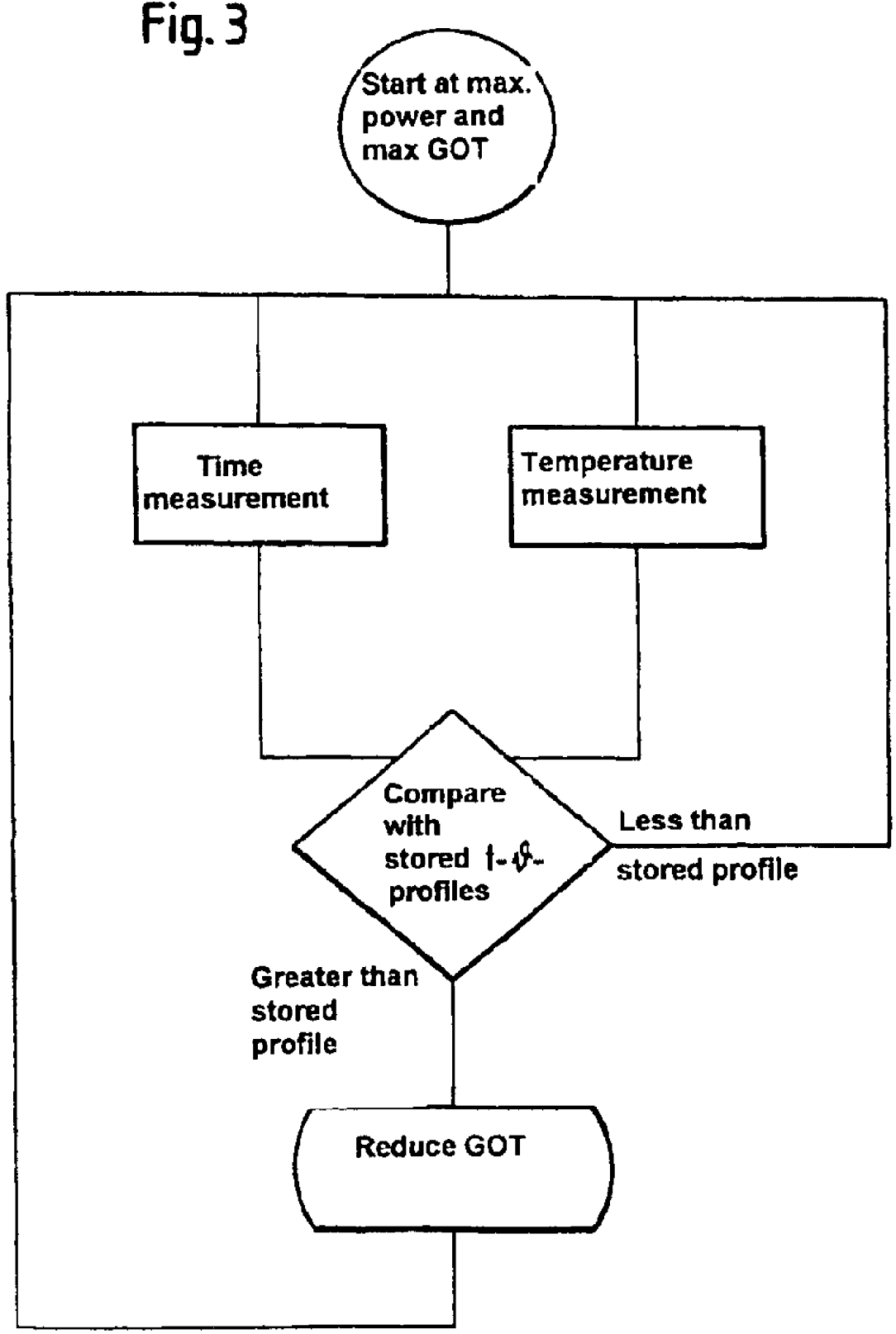
FIG. 3 shows a diagrammatic flowchart for the method according to the invention.

The drawing on FIG. 3 shows the flowchart for the procedure, in which the temperature reduction is controlled in a temperature measuring procedure. After the cooking procedure has begun, the temperature sensor 5 is used to measure the surface temperature of the cooking surface 4 and actuate the time measuring device of the controller 6 at maximum power and a maximum value for the glass surface temperature (GOT).

The temperature-time curves continuously determined during the cooking procedure are compared in the processor 61 of the controller 6 with the temperature-time profiles stored in the electronic memory 63. If the measured actual values lie below the stored temperature-time value pairs, the cooking procedure is continued with the currently valid switching temperature of the temperature limiter 64, since it has been guaranteed that a permissible cooking procedure is currently underway.

As soon as a comparison of actual values with the stored temperature-time value pairs has shown that these have been reached or even exceeded, the controller 6 decreases the switching temperature of the temperature limiter 64.

This procedure is characterized by the fact that, during an ongoing cooking procedure, it can be determined whether a cooking procedure is permissible or impermissible, and the switching temperature of the temperature limiter 64 can still be varied even during the cooking procedure based on an evaluation performed by monitoring the temperature of the cooking surface 4.

What is claimed is:

1. A method for limiting and/or controlling the surface temperature of a hob heated by an energy source and including a temperature limiter with a variable switching temperature, the hob including a ceramic heating surface, comprising:

varying the switching temperature of the temperature limiter during a cooking procedure according to a predetermined switching temperature-time profile, including setting said switching temperature of said temperature limiter to a maximum value at the beginning of a cooking procedure and reducing said switching temperature of said temperature limiter during said cooking procedure as a function of a selected cooking stage after several clock cycles of said temperature limiter and/or after a predetermined time interval.

2. A device for limiting and/or controlling the surface temperature of a hob heated by an energy source, the hob including a ceramic heating surface, comprising:

a controller including a temperature limiter with a variable switching temperature;

said controller including a memory for storing a predetermined switching temperature-time profile during a cooking procedure; and said controller including a processor for setting said switching temperature of said temperature limiter according to said stored switching temperature-time profile, said predetermined switching temperature-time profile including setting said switching temperature of said temperature limiter to a maximum value at the beginning of a cooking procedure and reducing said switching temperature of said temperature limiter during said cooking procedure as a function of a selected cooking stage after several clock cycles of said temperature limiter and/or after a predetermined time interval.

3. A method for limiting and/or controlling the surface temperature of a hob heated by an energy source and including a temperature limiter with a variable switching temperature, the hob including a ceramic heating surface, comprising:

varying the switching temperature of the temperature limiter during a cooking procedure according to a predetermined switching temperature-time profile, including said predetermined switching temperature-time profile corresponds to a heating empty procedure of the hob and upon determining said temperature-time profile constituting an impermissible cooking procedure and initiating a safety shutdown of the energy source.

* * * * *

UNITED STATES PATENT AND TRADEMARK OFFICE
CERTIFICATE OF CORRECTION

PATENT NO. : 6,995,343 B2  
APPLICATION NO. : 10/703238  
DATED : February 7, 2006  
INVENTOR(S) : Herbert Steiner et al.

Page 1 of 1

It is certified that error appears in the above-identified patent and that said Letters Patent is hereby corrected as shown below:

On title page  
Insert Item (63)  Continuation of Application No. PCT/EP02/04600 filed on Apr. 25, 2002.

Signed and Sealed this

Twenty-eighth Day of August, 2007

JON W. DUDAS  
*Director of the United States Patent and Trademark Office*